No. 729,623.

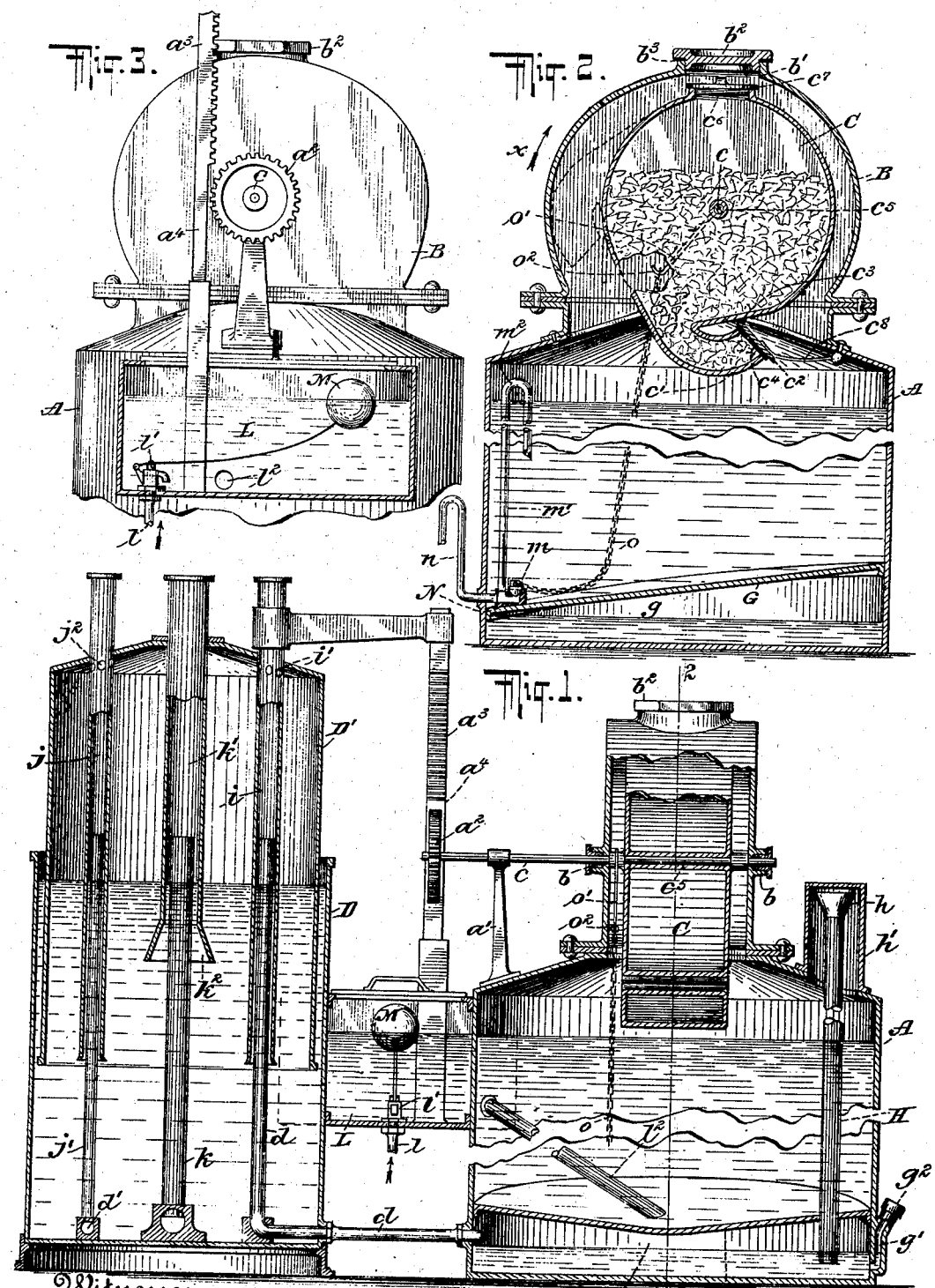

Patented June 2, 1903.

UNITED STATES PATENT OFFICE.

HOWARD E. MARSH, OF NEW YORK, N. Y., ASSIGNOR OF TWO-THIRDS TO MINNIE WHITNEY DENNE, OF NEW YORK, N. Y.

ACETYLENE-GAS GENERATOR.

SPECIFICATION forming part of Letters Patent No. 729,623, dated June 2, 1903.

Application filed August 8, 1902. Serial No. 118,865. (No model.)

*To all whom it may concern:*

Be it known that I, HOWARD E. MARSH, a citizen of the United States, residing in the borough of Manhattan, city, county, and State of New York, have invented certain new and useful Improvements in Acetylene-Gas Generators, of which the following is a specification.

My invention relates to improvements in acetylene-gas generators or, more generally, to improvements in apparatus for generating gas by the chemical reaction of one substance brought in contact with another.

The object of my invention is to improve apparatus of the above-indicated class by providing an improved feeder, which contains and periodically supplies the calcium carbid or analogous substance, the feeder being so constructed that its operation will be controlled by the amount of gas used and that the calcium carbid or analogous substance will be protected against the action of vapor during the intervals when the feeder is at rest.

A further feature of my invention relates to the supply of a fresh quantity of water or corresponding substance into which the calcium carbid or analogous compound is conveyed by the feeder.

The invention will be fully described hereinafter and the features of novelty pointed out in the appended claims.

Reference is to be had to the accompanying drawings, which illustrate one of the many forms in which my invention may be carried out, and in which—

Figure 1 is a sectional elevation of the complete apparatus. Fig. 2 is a sectional elevation of the generator proper on line 2 2 of Fig. 1, and Fig. 3 is an outside view of the upper part of the generator and also shows the feed-water tank in section.

The generator comprises a receptacle A, adapted to contain water and also forming in part a gas-chamber. To the upper portion of this receptacle is attached a casing B, preferably in the shape of a drum, and in this casing is mounted to oscillate the feeder C, carried upon a shaft $c$, which extends through the drum B, and packings $b$ are provided to prevent any leakage of gas at the bearings. At the upper end of the casing or drum B is located an opening $b'$, adapted to be closed by a cap $b^2$, a washer $b^3$ being preferably interposed, so as to secure an air-tight joint. This opening serves for the introduction of calcium carbid or an analogous substance into the feeder C, which for this purpose has an opening $c^6$ and a cap or cover $c^i$ to close said opening. The portion of the feeder C which is at the bottom in Figs. 1 and 2 is provided with an extension or discharge-spout $c'$, the end of which is adapted to be closed by a lid or cover $c^2$, hinged to the body of the feeder at $c^4$. The opening $c^6$ and the discharge-spout $c'$ are located at about diametrically opposite points of the feeder C. It will be seen that when the spout $c'$ is at the bottom, as in the normal position, the opening $c^6$ will be at the top, and therefore ready to receive a charge of carbid. At the same time the outlet of the spout will be closed by the lid $c^2$, and thus the egress of carbid from the spout will be prevented positively, although the cover $c^2$ is, strictly speaking, not required for this purpose, the shape of the spout $c'$, as hereinafter explained, being sufficient to accomplish this result. In any event, even if the lid $c^2$ were omitted it will be seen that when the discharge-spout $c'$ is in such a position that the carbid cannot escape therefrom the filling-opening $c^6$ will be at the top of the feeder C. Owing to this arrangement, I am enabled to fill the feeder with carbid to the top without any danger of the carbid escaping through the spout during the filling operation. It will be understood that the feeder C will, owing to the eccentric location of its center of gravity, seek to assume the position shown in Fig. 2, in which the lid or cover $c^2$ is closed partly by its own weight and preferably, also, by that of a weighted arm $c^8$, which is secured to said lid or cover. This arm may also be so arranged as to impinge against the top of the receptacle A, thus further assisting in pressing the lid $c^2$ tightly against the end of the spout $c^5$. In order to prevent the entrance of any gas or vapor into the feeder C along the shaft $c$, I prefer to make the feeder with a central sleeve $c^5$, which fits upon the said shaft. It will be observed that the discharge end of the spout $c'$ is curved, so that when the feeder is in the normal position (shown in Fig. 2) the discharge end of the spout points upwardly, and thus the discharge or escape of carbid would be prevented even without the use of the lid $c^2$. The spout, together with the carbid contained therein, also forms means for assisting the return movement of the feeder from the position illustrated by dotted lines to the normal position. During such return movement a new charge of carbid will pass into the spout, and the added weight of this carbid will aid in bringing the feeder back to its normal position.

The gas generated in the receptacle A rises into a head $h'$, within which is arranged the upper end $h$ of a pipe H, extending downwardly through a sloping partition G and into a purifying-chamber $g$, which is adapted to contain water. For filling this chamber I provide an inlet $g'$, which may be closed by a suitable cap $g^2$. From the purifying-chamber $g$ the gas passes through a pipe $d$ into the gasometer, which comprises a stationary part D, filled with water, as usual, and a movable part or bell D'. The end of the pipe $d$ forms a guide for a tube $i$, which is rigidly secured to the bell D' and which is provided with openings $i'$, through which the gas may pass from the interior of the tube $i$ into the bell. At a point diametrically opposite to the tube $i$ the bell D' carries a similar tube $j$, which fits over and is guided by a stationary tube $j'$, connected with the service-pipe $d'$ leading to the place of consumption. The tube $j$ is provided with apertures $j^2$ within the bell D', so as to allow the gas to pass from the bell into the tube. The movement of the bell is further guided by means of a centrally-arranged tube K', secured to the bell and provided at its bottom with a flaring portion $k^2$, which is at a higher level than the lower ends of the tubes $i$ and $j$. This tube K' fits over and is guided by a stationary tube K, which leads to a blow-off pipe.

With the bell D' is operatively connected, so as to follow the movement of the bell, a bar $a^4$, having rack-teeth or gear-teeth $a^3$, which under certain circumstances, as hereinafter explained, are adapted for engagement with a pinion $a^2$, secured upon the shaft $c$, which has a bearing in a bracket $a'$, projected from the top of the receptacle A.

Water is supplied to the generator by the following arrangement: A feed-water tank L is provided, preferably between the generator and the gasometer, as shown in Fig. 1, and this tank is connected with a water-supply pipe $l$, having a valve $l'$, controlled by a float M in a well-known manner—that is, the float operates to open the valve when the level of the water sinks, and thus the water is kept at a constant level in the feed-water tank L. From the lower part of the tank L a pipe $l^2$ leads to the receptacle A, so that the said receptacle and the feed-water tank are in communication, causing the water to stand at the same level in both, (if no account is taken of the gas-pressure.)

To provide for a renewal of the water contained in the receptacle A, I arrange near the bottom of the water-space of said receptacle a casing N, from which extends outwardly a discharge-pipe $n$, forming a seal or trap at a level considerably below the normal level of the water. From the casing N further extends upwardly within the receptacle A a siphon-pipe $m'$, having its free end turned downward, as shown at $m^2$, so that it will normally extend below the level of the water. The casing N further has an opening which is normally closed by a valve $m$. It will be understood that if this valve is raised water will rush out from the receptacle to the casing N and the discharge-pipe $n$ and will start the siphon through the pipes $m^2$ and $m'$, and even if the valve $m$ is allowed to almost immediately return to the closed position water will continue to flow out of the receptacle A until the level of the water sinks to the lower end of the pipe portion $m^2$, when the siphon will be broken. Of course as the level sinks in the receptacle A it will also sink in the feed-water tank L and the float M will cause the valve $l'$ to be opened, so that the tank L and generating-receptacle A will again be filled to the former level, as shown in the drawings. By the mechanism so far described a fresh quantity of water may be admitted to the generating-receptacle A. I prefer to make this admission of water dependent upon the operation of the feeder C, so that a fresh supply of water will be admitted each time a new charge of carbid is fed and preferably immediately before the admission of the carbid. For this purpose I connect the valve $m$ with the feeder C, as by mounting upon the shaft $c$ of the feeder an arm $o'$, having at its free end a hook $o^2$, and upon this arm is adapted to slide a link of a chain $o$, the lower end of which is connected with the valve $m$.

The carbid receptacle or feeder C having been filled and the feeder having by gravity assumed the position shown in Figs. 1 and 2, the operation is as follows: The attendant turns the shaft $c$ by hand, giving it about one-quarter of a revolution, so that the spout $c'$ will point downwardly, as indicated by dotted lines in Fig. 2. This causes the lid $c^2$ to open and a measured quantity of carbid to be discharged into the water contained in the receptacle A, the amount of carbid thus discharged depending upon the capacity of the spout $c'$. When the attendant gives this movement to the feeder C, a pull is exerted on the chain $o$ and the valve $m$ is opened, causing the renewal of a portion of the water contained in the receptacle A by the siphon action hereinbefore described in detail. The valve $m$ is opened for a short time only, as the further movement of the feeder C in the direction indicated by the arrow $x$ causes the upper end of the chain $o$ to slide along the arm $o'$ toward the center, and thus allows the valve $m$ to be closed by the pressure of the water. As soon as the attendant releases the feeder the latter returns to the position shown in Fig. 2 and the lid $c^2$ is closed automatically, so that no gas and vapor will have access to the carbid contained in the feeder. The gas generated by contact of the carbid with the water rises into the head $h'$ and passes through the pipe H into the purifying-chamber $g$. This chamber also acts as a cooler for the generator A. The gas then passes through the pipe $d$ and perforated tube $i$ into the bell D' of the gasometer. From this bell the gas passes through the perforated pipe $j$ to the pipe $j'$ and to the service-pipe $d'$. In case an excess of gas should be generated the bell D' will rise sufficiently to bring the lower end $K^2$ of the pipe K' above the level of the water, and the surplus of gas will be able to escape through the pipe K and the blow-off pipe. When in consequence of the carbid being used up or of the consumption of the gas the bell D' is lowered, the rack-teeth $a^3$ will engage the pinion $a^2$ and will turn the feeder C in the same manner in which it was turned by the attendant at the beginning of the operation. There will then occur an automatic renewal of the water in the receptacle A, together with the automatic feeding of a further charge of calcium carbid. As soon as, in consequence of the generation of new gas, the bell D' again rises sufficiently to release the pinion $a^2$, as shown in Fig. 3, the feeder C will automatically drop back to the position shown in Fig. 2. The rise and fall of the gasometer-bell will thus automatically control the feed of the water and of the carbid and the generation of the gas. The movement of the bell is an extremely-steady one on account of the guidance afforded by the pipes $d$, $j'$, and K.

Among the many advantages of my invention, in addition to those pointed out hereinbefore, I desire to mention the fact that I may use carbid of practically any size and that the movement of the feeder agitates the carbid, so as to keep the particles thereof separated and prevent their packing.

It will be understood that various modifications may be made without departing from the nature of my invention as long as such modifications remain within the scope of one or more of the appended claims.

What I claim as new, and desire to secure by Letters Patent, is—

1. In an apparatus of the class described, the combination with a generating-receptacle, of a feeder for supplying a gas-generating substance thereto, a feed-water-supply tank communicating with said receptacle, means for restoring the water in said tank to a predetermined level, a siphon for withdrawing a portion from the generating-receptacle, and means for starting said siphon.

2. In an apparatus of the class described, the combination of a generating-receptacle, a gasometer connected therewith, a feed-water tank connected with the lower part of said receptacle, means for supplying water to the feed-tank when the level of the water sinks therein, a siphon for withdrawing a portion of the water from the generating-receptacle, means for starting said siphon, a feeder mounted to turn and adapted to discharge a gas-generating substance into the generating-receptacle, a connection from said feeder to the means for starting the siphon, and an operating connection from the bell of the gasometer to the said feeder.

3. In an apparatus of the class described, the combination with a generating-receptacle, of a feeder mounted to turn, and provided with a spout, the delivery end of which is bent toward the feeder.

4. In an apparatus of the class described, the combination with a generating-receptacle, of a feeder for supplying a gas-generating substance to said receptacle, means for supplying a liquid to the generator, a siphon for withdrawing a portion of the liquid from said receptacle, and means controlled by the feeder for starting said siphon.

5. In an apparatus of the class described, the combination with a generating-receptacle, of a feeder mounted to turn and provided with a curved spout, the outer wall of which lies in the continuation of, or flush with, the periphery of the feeder, while the inner wall of the spout forms an angle with such periphery.

6. In an apparatus of the class described, the combination of a gas-generating receptacle, a movable feeder for supplying a gas-generating substance to said receptacle, means for withdrawing liquid from said receptacle, and a loose controlling connection extending from the feeder to the said means, so that the feeder will move independently of the said means until the looseness or slack of said connection is taken up, and will then suddenly operate said liquid-withdrawing means.

7. In an apparatus of the class described, the combination with a generating-receptacle, of a feeder for supplying a gas-generating substance to said receptacle, means for supplying water to the said receptacle and replenishing the water-supply to a predetermined level, and a siphon-pipe located within said receptacle and having its bend above the normal water-level, and its intake or inlet at a distance below said level, so that upon the starting of the siphon a portion of the liquid contained in the receptacle will be renewed.

8. In an apparatus of the class described, the combination with a generating-receptacle, of a feeder for supplying a gas-generating substance to said receptacle, means for supplying a liquid to said receptacle, a siphon extending within the receptacle to a point above the normal level of the liquid and provided with an aperture below the normal level of the liquid and below the inlet of the siphon, so that the siphon may be started by admitting the liquid through the said aperture, and a valve for normally closing said aperture.

9. In an apparatus of the class described, the combination with a generating-receptacle, of a feeder for supplying a gas-generating substance thereto, means for supplying a liquid to said receptacle, a siphon for withdrawing a portion of the liquid from the receptacle, a gasometer for receiving the gas from said receptacle, and means for starting the siphon, said means being operatively connected with the gasometer-bell.

10. In an apparatus of the class described, the combination with a generating-receptacle, of a feeder for supplying a gas-generating substance thereto, means for supplying a liquid to the receptacle, a siphon for withdrawing a portion of the liquid from the receptacle, a gasometer for receiving the gas generated in the receptacle, means for starting the siphon, and a loose connection from said means to the gasometer-bell, so that the bell will move without operating the siphon until the looseness or slack in the said connection is taken up.

11. In an apparatus of the class described, the combination of a generating-receptacle, a feeder mounted to turn and provided with an arm extending outwardly therefrom, a siphon for withdrawing a portion of the liquid from the said receptacle, a siphon-starting valve in the lower portion of the receptacle, and a loose connection from the said valve to the arm on the feeder, said connection being adapted to slide upon the said arm.

12. In an apparatus of the class described, the combination with a generating-receptacle, of a feeder for supplying a gas-generating substance thereto, means for supplying water to said receptacle, a siphon for withdrawing liquid from said receptacle, said siphon being provided on its outlet-leg with an aperture below the normal level of the liquid, and a valve for normally closing said aperture.

13. In an apparatus of the class described, the combination with a generating-receptacle, of a feeder mounted to turn and provided at its periphery with a spout so curved that in a certain position the material contained in the feeder will not be able to escape from the spout, the said feeder being also provided with a filling-opening in such a relation to said spout that when the filling-opening is at the top the escape of material from the spout will be prevented.

14. In an apparatus of the class described, the combination with a generating-receptacle, of a feeder mounted to turn and provided at about diametrically opposite points of its periphery with a filling-opening and with a discharge-spout respectively, and means for closing said spout when the filling-opening is at the top of the feeder.

In testimony whereof I have signed my name to this specification in the presence of two subscribing witnesses.

HOWARD E. MARSH.

Witnesses:
JOHN LOTKA,
MINNIE WHITNEY DENNE.